United States Patent [19]
Ackermann et al.

[11] Patent Number: 6,092,359
[45] Date of Patent: Jul. 25, 2000

[54] METHOD FOR CARRYING OUT CHEMICAL REACTIONS USING A TURBINE ENGINE

[75] Inventors: John Frederick Ackermann, Cheyenne, Wyo.; Randy Lee Lewis, Mason, Ohio; William Randolph Stowell, Rising Sun, Ind.

[73] Assignee: General Electric Company, Schenectady, N.Y.

[21] Appl. No.: 08/917,979

[22] Filed: Aug. 27, 1997

Related U.S. Application Data

[63] Continuation-in-part of application No. 08/651,186, May 17, 1996, abandoned.

[51] Int. Cl.$^7$ .................................................. F02C 6/00
[52] U.S. Cl. ........................................... 60/39.02; 60/39.07
[58] Field of Search ............................ 60/39.02, 39.07, 60/39.12, 39.33, 39.461

[56] References Cited

U.S. PATENT DOCUMENTS 2,839,892  6/1958  Rosenthal ............................ 60/39.05
4,265,732  5/1981  Dinulescu ............................ 60/39.02

*Primary Examiner*—Louis J. Casaregola
*Attorney, Agent, or Firm*—Jeffrey S. Abel; Noreen C. Johnson

[57] ABSTRACT

A process for carrying out chemical reactions in the gas phase or gas-liquid phase comprises feeding the chemical reagents under pressure into the combustion chamber of a turbine engine, where they react to form a desired chemical product. The heat energy evolved in the process can be utilized through the action of the turbine to power auxiliary equipment attached to the turbine engine, such as an electrical generator. In another embodiment, the turbine engine is utilized to carry out at least two reactions: a primary reaction which occurs in the combustion chamber of the engine, and a second reaction which occurs in an augmentor-section of the engine, utilizing the product of the primary reaction as a reagent in the production of a final product.

15 Claims, 2 Drawing Sheets

METHOD FOR CARRYING OUT CHEMICAL REACTIONS USING A TURBINE ENGINE

CROSS-REFERENCE TO RELATED APPLICATIONS

This application is a continuation-in-part of application Ser. No. 08/651,186 filed May 17, 1996 (abandoned).

BACKGROUND OF THE INVENTION

The present invention relates generally to chemical technology, and more particularly, to improved methods for carrying out chemical reactions to yield desirable products.

Much of the chemical industry is based on chemical reactions which convert raw materials into basic chemical compounds. These compounds are in turn converted to end products which are sold to other industries or directly to consumers. As an example, acrylonitrile can be prepared by catalytically reacting propylene, oxygen, and ammonia. The product can in turn be used to prepare acrylic-based materials—e.g., acrylic fibers, acrylonitrile-butadiene-styrene (ABS) resins, or a host of other important polymers.

On a commercial level, chemical products often have to be produced in very large quantities for the sake of efficiency—upwards of 1 million pounds per day. This scale of manufacturing requires large chemical plants with many individual unit operations for carrying out one or more chemical reactions, each of which may include a multitude of reaction steps. Land size requirements for accommodating such a plant are also considerable.

Batch processes for preparing basic chemicals are limited by the size of the reactor vessel, as well as the time required for reagents to be sufficiently mixed. Continuous processes are also limited in terms of production capacity by a variety of factors, such as the "throughput" rate, which dictates how quickly reagents can be fed to a reactor, heated, and sufficiently reacted to yield a product. Other factors also affect throughput rate, e.g., how quickly the product can be isolated and taken out of the reaction system.

If the product is an intermediate used to form a final product, an additional reactor may be needed at another site. Considerable engineering effort may be required to transfer products and other reagents to the second site. The added time requirements in this effort may further limit production capacity.

An example of a continuous reaction system is the fluidized bed reactor, which can be very useful because it allows good mixing of reagents and high product yield. Moreover, these reactors are usually very efficient, due in part to the fact that the catalyst can be removed from the bed and regenerated without shutting down the unit. Hydrogen cyanide is sometimes produced on a commercial scale by this technique. In that instance, ammonia and air are catalytically reacted with methane in the fluid bed to yield water and the desired product.

While systems like fluidized bed reactors exhibit many advantages, their use has some drawbacks as well. For example, the ammonia-methane reaction can be difficult to control because of non-uniformity in the bed itself. Some of this non-uniformity appears to be due to irregular flow of the reagents through the feed nozzles. "Hot spots" in the bed may develop, due to uncontrollable temperature excursions. These hot spots can cause coking in the reactor and ultimately, serious damage to the bed. Destruction of the fluidized bed when it contains expensive catalysts like platinum can in turn be a serious economic problem.

It is clear from the foregoing, as well as from a survey of the state of the art, that new processes for carrying out chemical reactions would be of considerable interest in the industry. These processes should be capable of handling large volumes of reagents quickly and efficiently, with high product yield. To that end, the processes should permit the use of high temperatures and high pressures when necessary. The processes should also accommodate more than one separate reaction, when multiple reactions are required to obtain a final product. Moreover, the processes should minimize plant size requirements as much as possible. Still another attribute of such processes would be the utilization of excess energy resulting from at least one of the reactions, e.g., heat energy which might otherwise be wasted.

SUMMARY OF THE INVENTION

One embodiment of the present invention is an improved method for reacting at least two reagents in the gas phase or liquid-gas phase to form a desired product. The method comprises feeding the reagents under pressure into the combustion chamber of a turbine engine, under reactive conditions, and then collecting the product after it exits the turbine. A wide variety of turbine engines would be amenable to such a process. Because of their design, such engines are capable of handling very high throughputs of raw materials or basic chemicals.

Exothermic reactions which evolve a great deal of heat energy are especially suited for this process, since the excess heat can be used to power the turbine, which in turn can power the compressor of the engine, along with any attached device. Moreover, the standard construction materials and conditions of structural integrity of typical turbine engines make them well suited for reactive atmospheres and rigorous chemical reactions which involve high heat and/or high pressure.

Thus, one aspect of the invention is a method for reacting at least two reagents in the gas phase or liquid-gas phase to form a desired product, said method comprising:

(a) feeding the reagents under pressure into a combustion chamber of a turbine engine;

(b) subjecting the reagents to reactive conditions; and (c) collecting the product.

According to another aspect of the present invention, the turbine engine is utilized to carry out at least two reactions: a primary reaction which occurs in the combustion chamber of the engine, and a second reaction which usually occurs in an augmentor section of the engine, utilizing the product of the primary reaction as a reagent in the production of a final product.

Still another aspect is a chemical reactor for reacting at least two reagents in the gas phase or liquid-gas phase to form a desired product. The reactor comprises:

a) a turbine engine;

b) means for directing the reagents into the engine under reaction-inducing conditions; and c) means for collecting the product.

As alluded to above, the turbine engine may include an augmentor, thereby permitting at least two reactions to be carried out in the reactor.

Numerous other details regarding the present discoveries are provided below.

DETAILED DESCRIPTION OF THE INVENTION

A wide variety of turbine engines may be modified and used in carrying out the present invention. They are all well-known in the art and described in a variety of references. Exemplary sources include U.S. Pat. Nos. 5,476,224; 5,475,979; 5,474,258; 5,472,313; 5,460,002; 5,435,126; 5,419,112; 5,404,709; 5,396,760; 5,323,604; 4,419,044; 4,414,815; 3,484,847; 3,484,144; and 3,448,582. Turbine engines are also described in The New Encyclopedia Britannica, Vol. 18 Macropaedia, 1994, pp. 360 et seq.; and in Encyclopedia Americana, International Edition, Vol. 16, Grolier, Inc. 1994, pp. 47 et seq. Turbines and related concepts are additionally described in Encyclopedia of Chemical Technology (Kirk-Othmer), 3rd Edition, 1982, John Wiley & Sons, Inc.: Vol. 3, pp. 328–351; and Vol. 19, pp. 73–87. Moreover, the following text is instructive for various aspects of turbine engines: Jet-Engine Fundamentals, by N. E. Borden, Jr., Hayden Book Company, Inc., 1967.

It is expected that a wide variety of turbine engines currently available could be adopted for use in this invention. Gas turbine engines are a prime example. They are now employed on land and in the water (i.e., on ships) to drive pumps, generators, or propellers. They also are the primary elements for most jet aircraft engines, developing thrust by accelerating the turbine exhaust flow through a nozzle. In regard to aircraft engines, either the turbofan or the turbojet types could be modified for use in the present invention.

Figure 1:
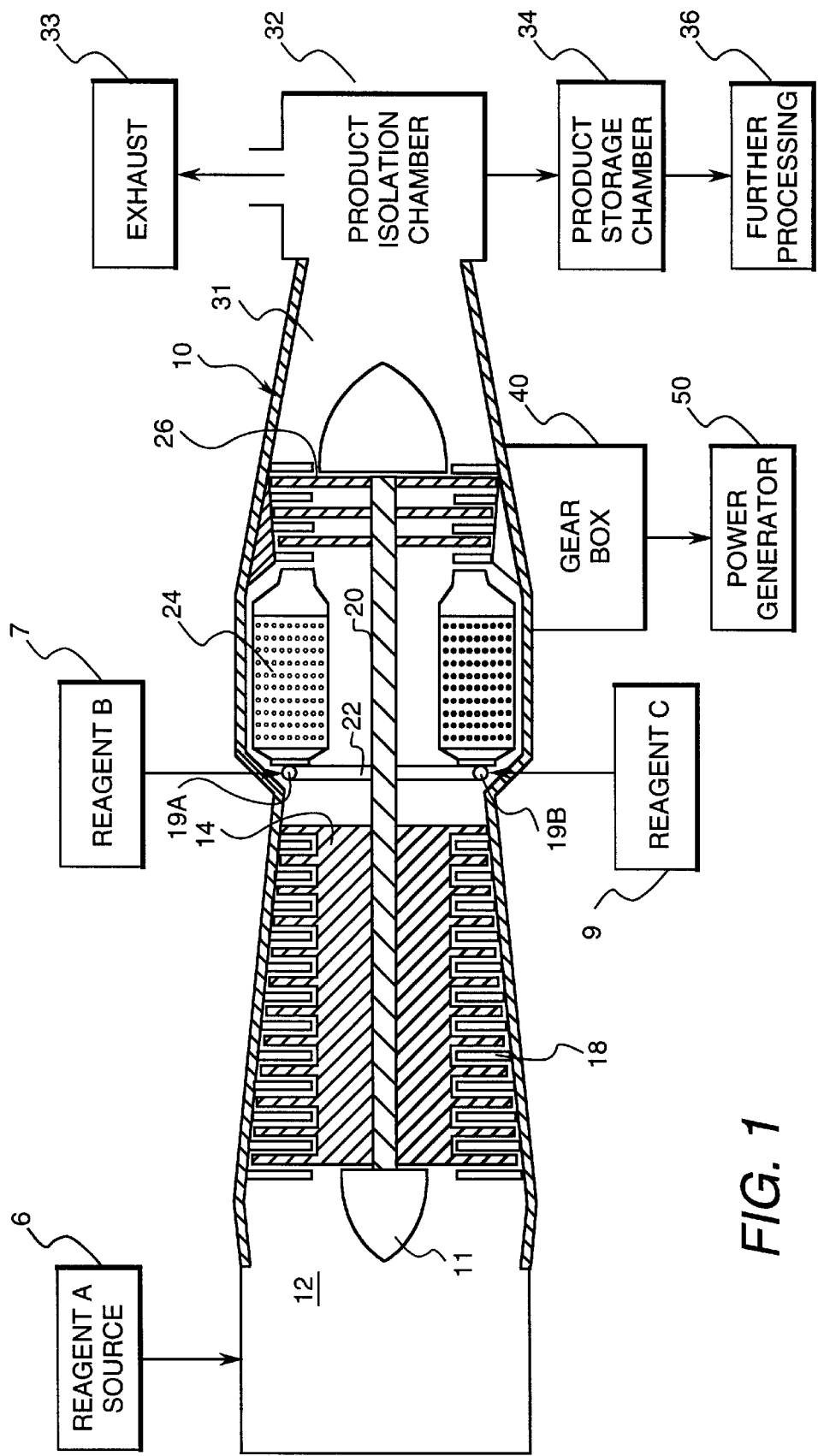
FIG. 1 is a cross-sectional view of a modified turbine engine which may be utilized for some embodiments of this invention.

The key elements of the turbine engine are the compressor, the combustor, and the turbine itself. FIG. 1 illustrates these elements, all contained within a casing 10. The casing for typical aircraft engines is made of an extremely durable material, such as various nickel-based alloys known in the art and utilized for this purpose. Such a material is well suited to safely contain highly exothermic reactions which may be carried out at high temperature and pressure, and is inert toward most chemical reagents.

In a typical gas turbine, inlet air is compressed and mixed with fuels sprayed through fuel nozzles which exit into the combustion chamber (sometimes referred to herein as the "combustor"). The resulting mixture is then burned to produce hot, expanding gases which pass through a turbine which is usually mounted behind the combustor. The high velocity of the gases causes the turbine to rotate, and this action usually serves as the power source used to drive the compressor and continue the overall cycle. Meanwhile, the hot expanding gases are exhausted to the outside through an engine nozzle or "tailpipe". (Sometimes, an external motor may be employed in known fashion for the initial start-up of the turbine engine. Such a mechanism is also within the scope of this invention).

FIG. 1 illustrates one embodiment of the modification of a typical turbine engine for the present invention. One of the reagents needed for a desired chemical reaction, Reagent A, is transported from a storage tank or other source 6, and is inserted into inlet 12. (As exemplified below, more than one reagent may be supplied to inlet 12, simultaneously with, or in selected proportion to, Reagent A.) As mentioned above, the reagents may be in either liquid or gas form. In general, gaseous reagents are sent through inlet 12. However, liquid reagents such as ammonia, propane or butane could be completely vaporized or converted to relatively small liquid droplets by known techniques, e.g., preheating or boiling the reagent, and then passed into the inlet. The somewhat indistinct boundary between the gas (vapor) phase and liquid phase of many reagents at higher temperatures is the basis for describing reactions herein as occurring in either the "gas phase" or the "liquid-gas phase". (Moreover, a solid reagent—e.g., one in particulate form—might be carried into the turbine engine in a gas stream or liquid stream.)

Methods for delivering gas or liquid reagents to the inlet are well known to industrial chemists and chemical engineers, and need not be dealt with in detail here. The type and grade of delivery tubes or pipes will of course depend on various factors, such as the chemical nature of the reagent being used, the delivery temperature and pressure, and the desired throughput. Pumps or fans may be used if needed to send Reagent A past centerbody 11 into compression chamber 18, although the suction present at the compressor inlet is usually very adequate for drawing in the reagent.

Compressors which constitute the key element of compressor chamber 18 are known in the art and described in many of the references set forth above. Thus, it is clear that compressor 14 can be one of several types, as described in the Hayden text mentioned above, for example. Axial compressors are often used in larger engines because of the high compression ratios they can deliver. Examples of this type of unit are the single compressors and dual ("twin-spool") compressors.

The pressure to which Reagent A is subjected in the compressor chamber will of course depend on the nature of the particular chemical reaction and various other factors, such as throughput requirements; the kinetics of the reaction; the specific heats of reaction; and the durability of the chamber and related structures. Moreover, Reagent A may be sent into the compressor by itself or in a stream of one or more additional gases or gas mixtures, such as oxygen, air or nitrogen, again depending on the particular reaction being carried out.

As Reagent A exits compression chamber 18 and enters combustion chamber 24, Reagent B and, optionally, Reagent C, will also be carried into the combustion chamber, as depicted in FIG. 1. As in the case of Reagent A, each of these reagents can also be a gas or a liquid, with the liquid reagents being vaporized or converted to small droplets as described previously. Reagents B and C can be sent into the combustion chamber by any appropriate technique known to skilled engineers. In preferred embodiments, these reagents are delivered by way of the fuel delivery system used for many turbines, e.g., for aircraft engine turbines. These systems are well-known and need not be described in detail here, since the selection of a particular system is not thought to be critical to the present invention. The Borden text mentioned earlier provides one exemplary description of a fuel delivery system, which includes fuel manifolds and fuel nozzles. The manifolds—essentially a set of pipes—would carry the chemical reagents from reagent sources (e.g., storage chambers 7 and 9), which would be located outside the turbine engine, to reagent nozzles 19A and 19B, respectively, as indicated in FIG. 1. For the sake of clarity and simplicity, the exact shape of the nozzles is not depicted. Those skilled in the art understand that reagent nozzles 19A and 19B are often actually a series of many nozzles, e.g., about twenty to sixty of them, which may be distributed among one or more nozzle sites. The number of nozzles employed will depend on the type of chemical reaction, throughput requirements, and the like. Tube 22 can be used to supply the reagents to any particular area of combustion chamber 24.

The fuel delivery system is particularly well suited to control the rate at which Reagents B and C are delivered to the chamber, based on known factors, e.g., reaction throughput, maintenance of stoichiometric reagent proportions, and the like. Moreover, the nozzles, which usually include some sort of pressure-atomizing system, can supply the reagents in spray form, to ensure extremely good mixing when necessary. All of the details regarding such systems, e.g., design of fuel pump and control mechanisms, are also understood by those skilled in the turbine art.

The reagent nozzles serve to introduce the reagents into combustion chamber 24 in spray or fully gaseous form, for rapid mixing with the stream of Reagent A. According to known technology, an ignition system (not shown in FIG. 1) may be utilized to ignite the reaction mixture, via a spark igniter. One exemplary mechanism is the capacitor-type ignition system. It is understood that most reactions contemplated for the present invention will be somewhat self-sustaining as further reagents are supplied to the combustor, although the reaction system can be reignited if necessary.

The turbine engine described to this point can accommodate a very large volume of reagents being supplied to the combustion chamber under conditions of high temperature and/or pressure. Standard chemical practice at the laboratory and commercial level then provides the basis for carrying out specific chemical reactions using such an engine. As mentioned earlier, any reaction which can be carried out in the gas phase or liquid-gas phase may constitute part of this invention. Exothermic reactions which produce a significant amount of heat are preferred, since the heat energy can be used to power a mechanical device, such as an electrical generator.

As a non-limiting, general guideline, chemical reactions with a heat output up to the maximum output of a typical commercial aircraft engine are very suitable for this invention. An example of such an engine is General Electric's CFM56 model, which consumes approximately 4,500 kg of jet fuel per hour under take-off conditions, with an average heat output of about 43,000 kJ/kg. Thus, the total energy output would be about 195,000 kJ/hr, which generates approximately 11,500 newtons of thrust. A reaction size which more closely parallels heat output of the engine under cruise conditions would be more common for this invention. Such reactions consume less than about 1,400 kg of fuel per hour, with a corresponding heat output of less than about 5.8 million J/hr.

An additional factor affecting the magnitude of the chemical reaction will be the integrity of the turbine itself, which is discussed below. In general, turbine engines operate in a temperature range of about 750° C. to about 1450° C. Temperatures above that range may cause the turbine blades to fail. Thus, chemical reactions having a heat of reaction which raises the temperature for a given amount of reagents to less than about 1450° C. are preferred. However, chemical systems evolving even larger amounts of heat could be carried out if certain precautions are taken, e.g., if a cooling mechanism for the turbine blades is installed. For reactions in which a relatively inexpensive gas like air or oxygen is one of the reagents, such a gas could be run through the combustion chamber in excess, thereby serving as another type of cooling mechanism.

The term "reactive conditions" is sometimes used herein to characterize chemical reactions which produce a desired product. This term is meant to include all factors considered by those skilled in the chemical art for carrying out reactions. Selection of temperature, pressure, catalyst use, and mixing conditions are all included within the scope of the term. Adjustment of any of these parameters is also included under "reactive conditions". As one example, reagents are usually supplied to a reaction vessel in stoichiometric (molar) proportions. However, chemists understand that "stoichiometric" can include some variation in strict reagent proportions, while still ensuring acceptable reaction conditions and good product yield. Moreover, it is also understood that occasionally, reagents are specifically added in non-stoichiometric proportions to optimize the yield of one specific product.

Several examples of reactions suitable for the present invention will be provided, although a very large number of additional suitable reactions are possible. As one example, hydrogen cyanide, an important chemical product for the manufacture of acrylonitrile and acrylates, is usually prepared by catalytically reacting ammonia and air with methane or natural gas, according to the following equation:

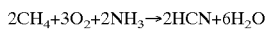

$$2CH_4 + 3O_2 + 2NH_3 \rightarrow 2HCN + 6H_2O$$

Reaction temperatures are usually in the range of about 950° C. to about 1100° C. With reference to FIG. 1, methane will arbitrarily be termed "Reagent A" and ammonia will be termed "Reagent B". In this instance, the source 7 of Reagent B may be directed into inlet 12 of the turbine engine, rather than being directed through nozzle 19A as depicted in the drawing. Thus, Reagents A and B could simultaneously be supplied in stoichiometric proportions from sources 6 and 7, respectively, to inlet 12. The gases could of course be premixed (if compatible), or mixed in a chamber within inlet 12, if necessary.

These gas reagents would then be compressed within compressor 14, at a pressure which usually ranges from about 3.5 atm to about 40 atm. Of course, certain reactions may require even higher pressures. Moreover, pressure levels can be readily adjusted during or following the reaction, e.g., in the case where urea is formed by decomposition of the intermediate compound, ammonium carbamate. As the compressed gases move into combustion chamber 24, a chemically appropriate amount of Reagent C—oxygen or air—is injected into the combustion chamber from source 9. Reaction will quickly begin and continue as the gas mixture is ignited and the required reaction temperatures are achieved. Reaction temperatures can be regulated by various means, such as adjusting reagent flow, or extracting more heat from the combustor via the action of the turbine, as discussed below.

In view of the fact that reactions can be carried out in the turbine engine under conditions of very high temperature and pressure, the use of catalysts may not be as necessary as when those reactions are carried out conventionally. However, catalysts could be introduced to the reaction system when desired, by various techniques. For example, the reaction for producing hydrogen cyanide is advantageously carried out with a precious metal catalyst or catalyst combination such as platinum/rhodium. In the present instance, the catalyst could be embedded in the thermal barrier coating (TBC)—an internal lining typically present in turbine engine combustors. As reagent gases contact the surface of the lining, the catalyst will be activated and perform its function.

The product hydrogen cyanide, a gas at elevated temperatures, will be driven as "exhaust" through turbine 26 and out nozzle 31, into a suitable receiving area, such as product isolation chamber 32 in FIG. 1. (Some specifics regarding product yield and recovery will be discussed hereinafter.) It is believed that utilization of a turbine engine modified and employed according to the present invention, and having dimensions approximate to those of General Electric's CFM56 aircraft engine, could result in the production of at least about 2,250 kg of hydrogen cyanide per production hour. On a smaller scale, it is believed that modification of General Electric's T-700 turbine engine (often used in helicopters) could result in about 225 kg of hydrogen cyanide product per hour.

As mentioned previously, the heat energy produced by the chemical reaction of the present invention is analogous to the energy which takes the form of hot, expanding gases in any gas turbine. In the present instance, the hot gases, which include the desired product, will flow through turbine 26, causing it to rotate and thereby perform any sort of desired mechanical work.

Any type of turbine is thought to be suitable for the present invention. Its size will depend in part on the magnitude of the chemical reaction being carried out. In many instances, the turbine and the compressor are both mounted on the same shaft, and rotate as a single unit, as depicted in FIG. 1. Shaft 20 connects these two elements, and the power extracted by turbine 26 can thus be used to power compressor 14. Mechanisms for controlling the power output of the turbine for a given amount of heat energy are known to those skilled in the art. Techniques for cooling the blades of the turbine for chemical reactions having very high heats of reaction are also known. Other aspects regarding the power output from the turbine will be discussed hereinafter.

As the chemical product exits nozzle area 31, it may be recovered and stored according to standard chemical practice. The product can be in solid, liquid, or gas form, and isolation chamber 32 will therefore be constructed of materials known to be suitable for any type of media. If the product exits nozzle area 31 under high temperatures, e.g., greater than about 900° C., it will typically be quenched by known techniques. For example, the product can be sprayed with cold water or with any other appropriate cooling media. Exemplary quenching techniques are described in *Ullmann's Encyclopedia of Industrial Chemistry,* Fifth Edition, copyright VCH 1987, Vol. A10, pp. 69–70. The specific technique described therein is directed to hot cracked gas coming from an ethylene furnace at 750–900° C., but it could be modified for use in the present invention without undue experimentation. Direct quenching, which involves the injection and evaporation of a liquid spray, could be carried out. Indirect quenching may alternatively (and preferably) be used, since it permits heat recovery at a temperature high enough to generate high pressure vapor products, such as steam. The hot vapor can of course be utilized to assist in powering turbine 26, or in powering some other mechanical device directly or indirectly connected to the turbine engine. Indirect quenching utilizes transfer-line exchangers (sometimes called "quench coolers"). Various parameters considered in quenching are described in references such as the Ullmann text, and need not be discussed further here.

Additional processes related to isolation and treatment of the chemical product may be employed as necessary, and they are all known in the art. For example, crystallization and precipitation techniques are described in Ullmann, Vol. B2. The drying of solid materials is also described therein, as well as solid-liquid separation techniques, product filtration, centrifugation, and the like. Moreover, the use of heat exchangers, which can transfer post-reaction heat to steam for exhaustion (e.g., via exhaust port 33) or recirculation, is described in Ullmann, Vol. B3. Other separation and/or purification methods are also described therein:

evaporation, distillation, rectification, liquid-liquid extraction, liquid-solid extraction, absorption, adsorption, and the like. Those of ordinary skill in the areas of industrial chemistry and chemical engineering will be able to readily determine which techniques are most appropriate for products prepared by the method of the present invention. Thus, product isolation chamber 32 of FIG. 1 may in fact consist of multiple treatment chambers or units suitable for carrying out any of these operations, prior to storage of the final product in chamber 34.

Moreover, those of skill in the art understand that storage of the product is not always necessary, since the product could immediately be sent to any further processing stage 36. The product could be further reacted to form other useful chemical compounds. It could also be blended with other materials, or polymerized by known techniques to manufacture a wide variety of resin products, examples of which are provided hereinafter.

Formaldehyde represents another example of a chemical product which can be made according to the present invention, and which is an important component for other useful materials, such as urea, melamine, phenolic resins, pentaerythritol and ethylene glycol. Formaldehyde can be prepared by various techniques, such as the oxidation of methanol. The reaction equation is as follows:

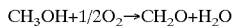

It is a highly exothermic reaction, with an overall heat of reaction of about −159 kJ/mol. In this instance, methanol, which is readily vaporized, can be supplied to inlet 12 from source 6, while the oxygen could be supplied from source 7, via reagent nozzle 19A. An appropriate reaction temperature would be maintained as described previously—usually in the range of about 575° C. to about 675° C. The usual catalysts for this type of reaction could be utilized, e.g., silver, copper, iron-molybdenum oxide, and the like. The product would be collected in isolation chamber 32, as described previously.

Still another useful exemplary chemical product which can be made by this invention is hexamethylenediamine—an important building block for high polymers like the polyamides, e.g., Nylon 66. There are several ways to make such a material, and each could be carried out according to the teachings herein. For example, it can be prepared by the reaction of adipic acid and ammonia in the catalytic vapor phase to yield adiponitrile, followed by liquid phase catalytic hydrogenation to yield the desired product. In this instance, ammonia could again be fed into inlet 12 from source 6, while adipic acid, heated or dissolved in a suitable solvent like an alcohol, could be injected from source 7 into the combustor. The intermediate product, adiponitrile, could be isolated in chamber 32 and then recirculated by known techniques (not shown) to inlet 12, e.g., from another source. The adiponitrile would then be vaporized or reduced to droplet form and sent through compressor 14 at appropriate pressures. Meanwhile, hydrogen could be introduced into the combustor from source 9, via nozzle 19B, to carry out the hydrogenation reaction (catalyzed if necessary), finally recovering the hexamethylenediamine product in chamber 32.

There are many additional examples of chemical reactions which can be carried out according to this invention. Several more examples will be provided here in shorthand form. The details regarding these reactions are well known in the chemical industry, and can be found in numerous sources, such as the aforementioned *Encyclopedia of Chemical Technology* treatise; *The Concise Encyclopedia—Chemistry*

(translation and revision by M. Eagleson), copyright 1993 by Walter de Gruyter (Berlin); and *The Condensed Chemical Dictionary*, 10th Edition; rev. by G. Hawley, Van Nostrand Reinhold Company, 1981.

Examples of such reactions are as follows:

1) The preparation of aniline by vapor-phase reduction of nitrobenzene with hydrogen; or by reaction of chlorobenzene and ammonia.

2) The preparation of acetic acid by oxidation of acetaldehyde or butane, or by the carbonylation of methanol.

3) The preparation of acrylonitrile, by reacting propylene, oxygen and ammonia, or by reacting hydrogen cyanide with acetylene.

4) The preparation of urea by reaction of ammonia and carbon dioxide, via an ammonium carbamate intermediate.

Moreover, it is believed that various types of synthesis gas ("syngas") could be manufactured by this process. Syngas mixtures are useful for synthesizing a wide range of compounds, such as ammonia and methanol. The organic source materials may be methane, natural gas, coke, heavy petroleum oils, or naphtha, for example. Simplified examples of known syngas reactions are:

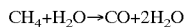
$$CH_4 + H_2O \rightarrow CO + 2H_2O$$

and

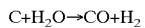
$$C + H_2O \rightarrow CO + H_2$$

In the second of these reactions, a carbon/water slurry may be used as the combustion input.

In the case of all of the chemical compounds being prepared as set forth herein, the specific reaction parameters are known in the art, and can be adjusted to conform to a desired commercial scale without undue experimentation. As but one example, the aforementioned preparation of acetic acid by the carbonylation of methanol (e.g., using carbon monoxide) is sometimes carried out on an industrial basis at a temperature in the range of about 140–160° C. and a pressure in the range of about 2–5 MPa, using a catalyst like cobalt(II) iodide. The temperature and pressure conditions can readily be attained with the turbine engine described above, and adjusted as necessary for higher throughput and other factors outlined earlier. Similarly, the catalyst, if necessary, can be incorporated into the reaction system as also described previously.

The choice of how to incorporate each reagent into the turbine engine in each instance will depend on various factors, such as the reactivity of each reagent toward another reagent at normal and elevated temperatures, and the physical state of the reagent and other properties it might exhibit. For example, a corrosive reagent might be more appropriately inserted into combustor 24 via reagent nozzles 19A or 19B than through compression chamber 18 (see FIG. 1). Moreover, when more than two reagents are being employed, the choice of where each will be delivered to the turbine engine can also be made without undue experimentation. Thus, Reagents B and C (and additional reagents, if necessary) may all be sent directly to the combustor through one or more of the reagent nozzles. On the other hand, all of the reagents could be fed into inlet 12, individually or in any selected premixture, as long as steps are taken to prevent premature or undesirable reactions between any particular reagents. Standard chemistry and chemical engineering guidelines are instructive for this aspect of the invention.

Other useful chemical products which can be manufactured according to the present invention include 2,6-dimethylphenol, formed by the reaction of phenol and methanol, which can in turn be polymerized by known techniques to form polyphenylene ethers. Thus, the preparation of polymers or polymer blends utilizing chemical compounds prepared as described above is also within the scope of the present invention. As yet another example, the acrylonitrile mentioned above can subsequently be used in polymerization reactions (e.g., graft polymerization) with butadiene and styrene to form ABS (acrylonitrile-butadiene-styrene) resins.

Figure 2:
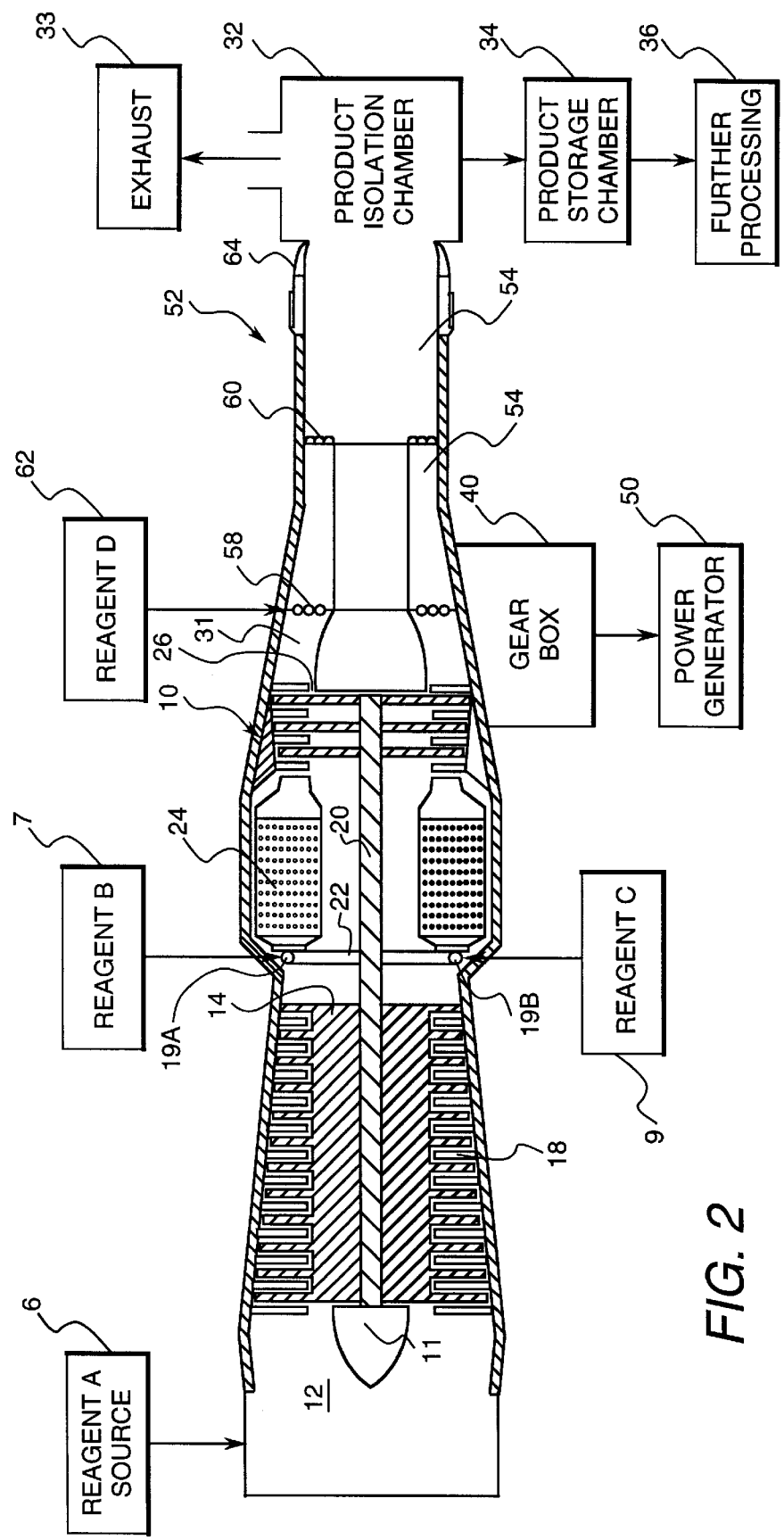
FIG. 2 is a cross-sectional view of an alternative, modified turbine engine which may be utilized for other embodiments of the present invention.

Another key aspect of this invention involves the generation and utilization of power which results from carrying out the chemical reactions discussed above. The mechanical energy resulting from the rotating action of turbine 26 may be transferred by well-known mechanisms to any type of gear drive located within gear box 40, as shown in FIG. 2. The gear drive can in turn controllably transfer mechanical energy to a wide variety of auxiliary devices, such as pumps, motors, or electrical generators. Power generator station 50 in the drawing represents one such example.

All critical details regarding the use of a turbine engine to drive an electric generator are well known in the art of power generation, and need not be dealt with in detail here. In many conventional gas turbine engines driving an electrical generator, control of turbine speed can be effected very easily, e.g., by burning less fuel and thereby lowering the exit temperature of the combustion chamber. Aircraft engines include more sophisticated control mechanisms (computer-driven controls), and these are also well known. In the present invention, the same mechanisms may easily be employed, e.g., lowering the reagent intake if necessary to accommodate electrical load requirements. Moreover, the heat extracted from a given chemical reaction can be controlled in part by adjusting the electrical load for the generator. For example, higher energy output in terms of heat generation can be dissipated via an increase in turbine speed and generator activity. The heat energy could alternatively be directed through exhaust chamber 33, as described previously.

In another embodiment for this invention, certain types of turbine engines can be used to carry out at least two chemical reactions. The primary reaction occurs in the combustion chamber of a turbine engine, as described previously. In this embodiment, the product of the primary reaction serves as an intermediate reagent for the production of a final product in an afterburner section of the engine. As exemplified below, the primary reaction is often an oxidation reaction which involves the delivery of air or oxygen to the compressor or combustor.

FIG. 2 depicts a turbine engine suitable for carrying out at least two chemical reactions according to this embodiment. Reference numerals common to those of FIG. 1 are used to identify identical elements. The primary additional feature in FIG. 2 is the afterburner 52, which is sometimes referred to herein as an "augmentor". Augmentors are well-known components on some types of turbine engines. They are described in many references, such as *Jet-Engine Fundamentals*, discussed earlier. Generally, the augmentor may be thought of as a simple ramjet engine attached to the rear turbine case of a turbojet or turbofan engine. The augmentor utilizes air that has passed through the basic engine and has not been consumed by combustion, since this air is able to support additional combustion if more fuel is added.

Augmentors usually include four main components: an afterburner duct, designated in FIG. 2 as having a forward section 54 and a rear section 56; fuel nozzles or spray bars 58; flameholders 60, and an exhaust nozzle 64. In the present embodiment, an intermediate product, i.e., the product of the primary reaction taking place in combustion chamber 24, is passed into the forward section 54 of the augmentor. An additional reagent, designated in the figure as Reagent D, would also be directed into the augmentor to react with the intermediate product to form a final product. In preferred embodiments, Reagent D would be added through spray bars 58, which are well suited to control the rate of delivery. The spray bars can be adapted to supply the reagent in liquid or spray form. As in the case of the primary reaction which occurs in the turbine section of the engine, typical reaction considerations, such as the maintenance of stoichiometric reagent proportions, would influence the addition of Reagent D. Sensors are available to measure the amount of intermediate product which is passing into the augmentor, so that the proper amount of Reagent D can be introduced.

In a conventional turbine engine, gases leaving the basic engine and moving into the augmentor are under considerably lower pressure, since most of the associated energy has been extracted by the turbine. Thus, the intermediate product in an engine utilized in accordance with this invention would also enter the augmentor under reduced pressure, e.g., under about 100 psi. Many different reactions can be carried out under these pressure conditions.

One example of a two-reaction process for this embodiment is the production of nitric acid. Nitric oxide could be reacted with air in a primary reaction in the turbine section of the engine, producing nitrogen dioxide. The intermediate product nitrogen dioxide would flow into the augmentor 52. Water or another aqueous material would simultaneously be sprayed into the augmentor through spray bars 58, reacting with the nitrogen dioxide to form nitric acid. The walls of the augmentor are usually made from a nickel-based alloy like Inconel® 625, coated with a non-reactive oxide or similar type of material. The coated walls would be well suited for accommodating acidic products like nitric acid.

Another example of a two-reaction process is the production of ethylene glycol. Ethylene gas can be reacted with oxygen in the turbine section of the engine to prepare ethylene oxide, which is passed into the augmentor. Reagent D in this instance would again be an aqueous material such as water, which is also delivered to the augmentor. The acid-catalyzed cleavage of the ethylene oxide would yield ethylene glycol.

In fact, the epoxide-based compound produced in the primary reaction can be reacted with a variety of acids or bases in the augmentor to yield a number of useful final products. These reactions follow standard principles of acid-catalyzed cleavage or base-catalyzed cleavage of epoxides, as described, for example, in *Organic Chemistry* by Morrison and Boyd, 3rd Edition, Allyn and Bacon, Inc., 1973. As non-limiting examples, phenol or ethanol could be supplied to the augmentor to form 2-phenoxyethanol or 2-ethoxyethanol, respectively. In similar fashion, ammonia could be supplied to the augmentor to react with the epoxide, forming 2-aminoethanol. Again, those of ordinary skill in the chemical art are familiar with relevant reaction conditions, such as temperature and pressure, which will optimize the yield of any of these products.

Still another example of a two-reaction process is the production of various acid derivatives. As an example, an alkylbenzene such as ethylbenzene can be reacted with oxygen in the turbine section of the engine to prepare the corresponding acid, which is passed into the augmentor. The acid can then be reacted in the augmentor to yield a number of useful compounds, such as acid chlorides by reaction with phosphorus trichloride or phosphorus pentachloride, or esters by reaction with alcohols. As one specific illustration, p-xylene could be oxidized to terephthalic acid in the primary reaction. Methanol could then be supplied to the augmentor as Reagent D, reacting with the acid to form dimethyl terephthalate—an important compound for the preparation of commercial polyesters and related polymers.

In regard to acid chlorides, acetaldehyde could be oxidized to form acetic acid in the primary reaction. A catalyst such as a manganese compound might be supplied to the turbine through a suitable inlet to promote the reaction. The acetic acid could then be reacted in the augmentor with a supplied reagent like phosphorous trichloride to yield acetyl chloride.

In the 2-reaction embodiment, the final chemical product would pass from the rear section 56 of the augmentor into a suitable product isolation chamber 32, as in the other embodiments. The other possible elements are as described previously, e.g., an exhaust port and product storage chamber. Further processing would also be carried out as described above. Again, those of ordinary skill in the art are familiar with all of the required chemical operations which might be necessary to store, purify, and use a given product. Moreover, power can also be generated in this embodiment, by using the mechanical energy resulting from the rotating action of the turbine, as described previously.

Many modifications and variations for all of the embodiments of this invention are possible in view of the description thus provided. As but one example, the conventional use of dual turbines, one driving the compressor while another drives auxiliary devices like the power generator, is possible for this invention.

Some elements often found in turbofan engines constitute additional variations falling within the scope of this invention, and described in some of the cited references. For example, the turbofan engine usually includes an outer shroud or "bypass duct" which encloses the engine core. Air can then pass through both the core and the shroud, according to a predetermined bypass ratio. In the present instance, the bypass ratio could be adjusted to allow for more air or other cooling media to assist in cooling the final chemical product, for example.

It should thus be understood that many changes may be made in both the equipment- and chemical aspects of this invention. These changes are within the scope of the invention defined in the appended claims.

All of the patents, articles, and texts mentioned above are incorporated herein by reference.

What is claimed is:

1. A method for carrying out at least two reactions in the gas phase or liquid-gas phase to form a desired final product, comprising the following steps:
    (a) feeding the reagents for a primary reaction under pressure into a combustion chamber of a turbine engine;
    (b) subjecting the reagents to reactive conditions sufficient to form an intermediate product;
    (c) delivering the intermediate product to an augmentor within the turbine engine; and
    (d) reacting the intermediate product in the augmentor with at least one additional reagent to form a final product.

2. The method of claim 1 wherein the primary reaction is an oxidation reaction.

3. The method of claim 1 wherein the final product is recovered in a chamber which communicates with the augmentor.

4. The method of claim 1 wherein nitrogen dioxide is produced in the primary reaction, and is reacted with an aqueous-based material to form nitric acid in a second reaction.

5. The method of claim 1 wherein ethylene oxide is produced in the primary reaction, and is reacted with water to form ethylene glycol in a second reaction.

6. The method of claim 1 wherein ethylene oxide is produced in the primary reaction, and is reacted with an aromatic or aliphatic alcohol to form the corresponding hydroxy ether in a second reaction.

7. The method of claim 1 wherein an acid is produced in the primary reaction, and is reacted with an alcohol to form the corresponding ester in a second reaction.

8. The method of claim 7 wherein the acid is terephthalic acid, and the ester is dimethyl terephthalate.

9. The method of claim 1 wherein the turbine engine comprises a compressor which communicates with the combustion chamber, and a turbine which also communicates with the combustion chamber, the augmentor communicating with the turbine.

10. The method of claim 9 wherein at least one of the reagents for the primary reaction is fed in vapor or liquid form through the compressor and into the combustion chamber.

11. The method of claim 9 wherein at least one of the reagents for the primary reaction is fed to the combustion chamber from at least one reagent inlet connected to a reagent source and terminating within the chamber.

12. The method of claim 9 wherein the intermediate product is delivered to the augmentor from the turbine, and an additional reagent is delivered to the augmentor through spray bars located therein, combining with the intermediate product to form the final product.

13. The method of claim 9 wherein the reaction between the reagents produces heat energy which powers said turbine.

14. The method of claim 13 wherein the turbine is utilized to power auxiliary equipment.

15. The method of claim 14 wherein the auxiliary equipment comprises an electrical generator.

* * * * *